United States Patent
Linsky et al.

(10) Patent No.: US 7,474,635 B2
(45) Date of Patent: Jan. 6, 2009

(54) COMMUNICATION SYSTEM AND METHOD USING TIME DIVISION MULTIPLEXED (TDM) DOWNLINK

(75) Inventors: Stuart T. Linsky, Rancho Palos Verdes, CA (US); Harvey L Berger, Redondo Beach, CA (US)

(73) Assignee: Northrop Grumman Corp., Los Angeles, CA (US)

( * ) Notice: Subject to any disclaimer, the term of this patent is extended or adjusted under 35 U.S.C. 154(b) by 903 days.

(21) Appl. No.: 10/702,023

(22) Filed: Nov. 5, 2003

(65) Prior Publication Data
US 2005/0094587 A1 May 5, 2005

(51) Int. Cl.
*H04J 4/00* (2006.01)
*H04B 7/14* (2006.01)

(52) U.S. Cl. ..................... 370/307; 370/316
(58) Field of Classification Search ........... 370/307, 370/478, 316
See application file for complete search history.

(56) References Cited

U.S. PATENT DOCUMENTS 4,359,690 A * 11/1982 Tucker et al. .............. 327/94
5,943,324 A    8/1999 Ramesh et al.
6,249,514 B1   6/2001 Campanella
6,363,262 B1 * 3/2002 McNicol ................ 455/561
2001/0012277 A1 * 8/2001 Campanella ............ 370/323

FOREIGN PATENT DOCUMENTS

EP    0 825 730    2/1998

OTHER PUBLICATIONS

Maruyama, H. et al., Onboard processor for millimeter-wave personal satellite communications system, May 23, 1993, pp. 1480-1486, vol. 3, Japan.

* cited by examiner

*Primary Examiner*—Kevin C Harper
(74) *Attorney, Agent, or Firm*—Patti, Hewitt & Arezina LLC

(57) ABSTRACT

A technique for reducing power requirements in a communication transponder by converting signals in multiple uplink channels carried in frequency division multiplexed (FDM) form on multiple uplink beams, to a lesser number of downlink beams that operate in time division multiplexing (TDM) but at a bandwidth different from and preferably greater than the bandwidth of the uplink channels. Because the TDM downlinks can utilize amplifiers operating at or near peak power, whereas conventional FDM downlinks must operate with amplifiers backed off to minimize intermodulation products, use of the TDM downlinks effects significant power savings.

16 Claims, 4 Drawing Sheets

COMMUNICATION SYSTEM AND METHOD USING TIME DIVISION MULTIPLEXED (TDM) DOWNLINK

BACKGROUND OF THE INVENTION

The present invention relates generally to communication systems and, more particularly, to communication systems in which information is transmitted from one point to another on or near the earth's surface, by way of one or more intermediate nodes or stations. An intermediate node may be an earth-orbiting satellite, a high-altitude platform or, in the case of terrestrial system, an aggregation node where signals from multiple users are aggregated and forwarded. In this description, the invention will be described in the context of a satellite communication system, but it should be understood that the equivalent function of a satellite may be performed by a high-altitude platform or an aggregation node on the ground. This description also uses the terms "uplink" and "downlink" to refer to signal transmission to and from a satellite, respectively, but it should also be understood that use of these terms is not intended to limit the invention to a satellite communication system.

In the context of satellite communications, systems of the general type referred to above are sometimes referred to as "bent pipe" systems, in which an orbiting satellite functions essentially as a transponder, receiving data over multiple uplink channels and transmitting the information back to the ground over multiple downlink channels. Conventionally, the multiple uplink and downlink channels have separate radio-frequency (RF) carriers that are frequency division multiplexed (FDM) for uplink and downlink transmission. The multiple uplink carriers are usually transmitted from multiple uplink sources. For uplink reception on the satellite, the received composite uplink signals are separated by frequency filtering into multiple carriers, which are separately processed and routed. For downlink transmission from the satellite, the separate signals are recombined into a composite FDM signal and subsequently transmitted.

Although this FDM transmission technique has known advantages, the downlink aspect of FDM transmission suffers from a significant drawback. Amplifiers used in FDM transmitters must be "backed off" to run below the saturation point in their performance characteristic to ensure they operate in a linear range in which unwanted intermodulation products are minimized. These unwanted intermodulation products reduce the effective signal to noise ratio of the downlink signal. However, operation of amplifiers backed off from their peak power levels results in a power loss. Although the same considerations apply to the uplink, amplifiers in a ground station can be selected to provide a desired uplink power with minimal consideration of this power penalty. For downlink transmission, however, operation of amplifiers significantly below their peak power is a serious satellite efficiency and dc power concern.

Ideally, it would be desirable to operate downlink transmitter amplifiers at their peak power if the disadvantages that usually ensue from doing so could be avoided. The present invention is directed to this end.

SUMMARY OF THE INVENTION

The present invention resides in a technique for receiving uplink data that was transmitted in a frequency division multiplexed mode and retransmitting the data over one or more downlink beams operating in a time division multiplexed mode. Briefly, and in general terms, the method of the invention comprises transmitting, in one or more uplink beams, communication signals modulated as separate uplink channels onto separate carriers that are frequency division multiplexed (FDM); receiving the FDM uplink signal carriers at a communication node; converting the multiple FDM uplink signals to at least one sequence of time division multiplexed (TDM) signals; and transmitting the sequence of TDM signals as downlink beams. In one embodiment of the invention, the downlink TDM beam has a much greater bandwidth than any of the uplink FDM channels. The transmitting step includes operating the downlink transmitter amplifiers at peak power.

More specifically, the step of converting from FDM to TDM comprises separating the received FDM uplink signal carriers by frequency; converting the separated signals from analog to digital form at a first sampling rate S1; storing the sampled digital signals derived from the uplink signal carriers in a buffer memory, as blocks of data, each of which corresponds to a selected time duration; retrieving the blocks of data from the buffer memory in at least one selected sequence that becomes a sequence of TDM signals; and converting the retrieved sequence of blocks of data back into analog form at a second selected sampling rate S2. Preferably, although not necessarily, S2 is greater than S1. In a specifically disclosed embodiment of the invention, the number of uplink channels is n; the number of downlink beams is one; the second sampling rate S2 is n times the first sampling rate S1; and the bandwidth of the downlink beam is n times the bandwidth of one of the uplink beams.

In one disclosed embodiment of the invention, data signals derived from at least one selected uplink channel are retrieved from the buffer memory at a slower rate than the other channels, and occupy a larger proportion of time in the TDM downlink beam than data signals derived from the other channels. The selected channel is, therefore, less susceptible to downlink transmission noise, but uses more downlink capacity than the other channels.

The invention may also be considered to take the form of a communication system transponder with reduced downlink power requirements. The transponder comprises a receiver for receiving and separating frequency division multiplexed (FDM) signals that have been transmitted as separate FDM uplink channels on multiple uplink beams; and means for routing the frequency division multiplexed (FDM) multiple uplink signals to a number of time division multiplexed (TDM) downlink beams. The means for converting includes means for time-compressing signals in the uplink channels to accommodate them in one or more downlink beams of greater bandwidth. The transponder also includes a transmitter for transmitting the time-compressed signals using time division multiplexing (TDM). Transmitting TDM signals allows the transmitter amplifiers to be operated at peak power. More specifically, the means for converting comprises analog-to-digital conversion means, operating on the received and separated FDM signals at a first sampling rate S1; a buffer memory for storing the received and separated signals in digital form as blocks of data corresponding to a selected time duration; means for retrieving the stored blocks data from the buffer memory in as many sequences as there are downlink beams; and digital-to-analog conversion means, operating on the retrieved sequences of blocks of data at a second sampling rate S2, where S2 is preferably but not necessarily greater than S1. In a specifically disclosed embodiment, the number of uplink channels is n; the number of downlink beams is one; the second sampling rate S2 is n times the first sampling rate S1; and the bandwidth of the downlink beam is n times the bandwidth of any of the uplink channels. As discussed above in reference to the method of the invention, the transponder may also be configured such that all n channels do not share the downlink bandwidth equally. For example, at least one selected uplink channel may use more of the TDM downlink bandwidth than the other channels, providing increased margin (i.e., decreased susceptibility to transmission noise) at the expense of using a greater share of the downlink capacity.

It will be appreciated from the foregoing summary that the present invention represents a significant advance in the field of communication systems. In particular, the invention provides for transponder power savings by utilizing a TDM downlink, which may have a higher bandwidth than a larger number of FDM uplinks. Other aspects and advantages of the invention will become apparent from the following more detailed description, taken in conjunction with the accompanying drawings.

DETAILED DESCRIPTION OF THE INVENTION

Figure 1:
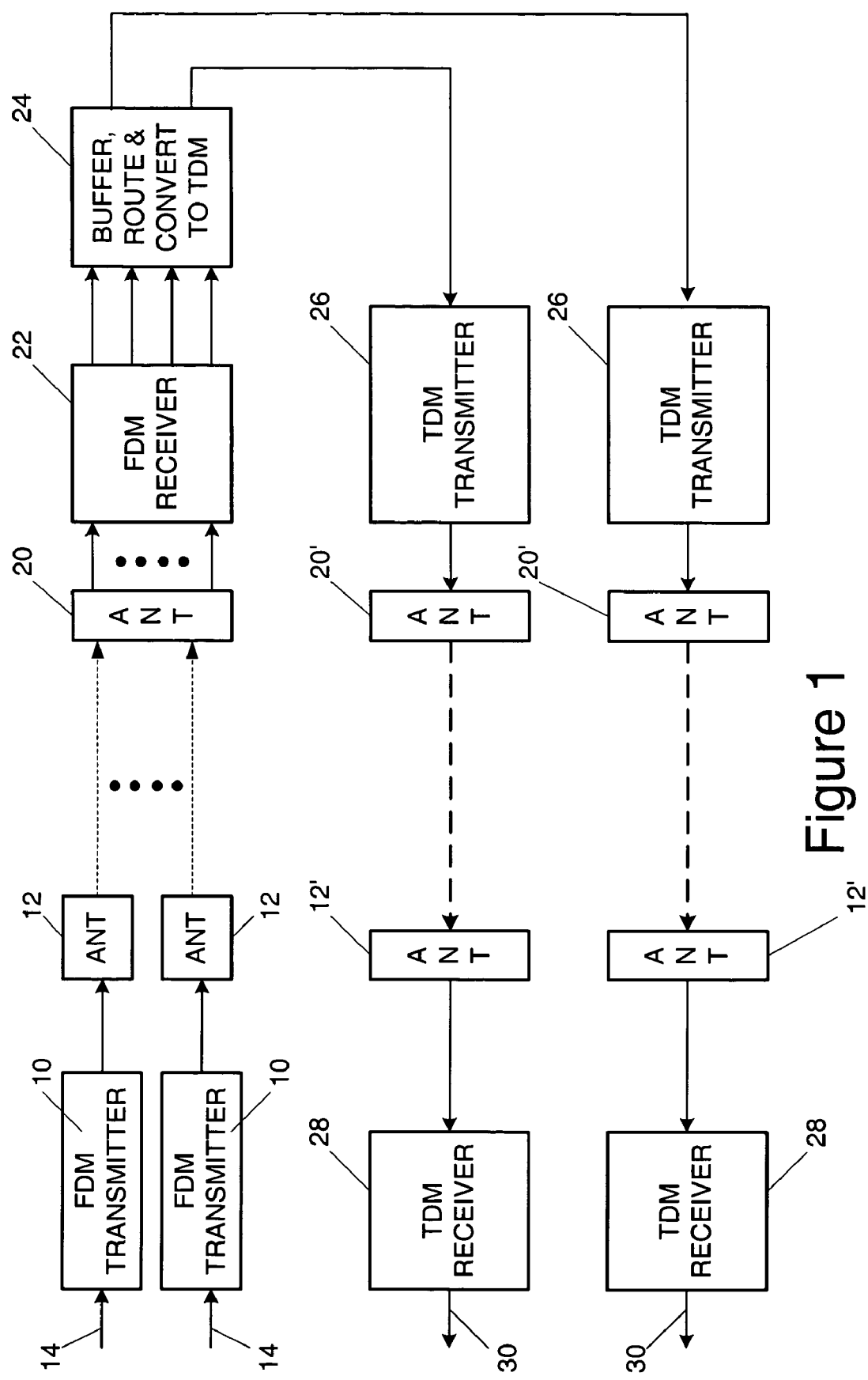
FIG. 1 is a block diagram showing the principal components of a communication system utilizing the present invention.

As shown in the drawings for purposes of illustration, the present invention is concerned with a technique for use in a communication system. Although the invention is described below in the context of satellite communication systems, it will be understood that the principles of the invention apply equally well to communication systems using a high-altitude platform as a common communication node, and to terrestrial communication systems using an aggregation node. The term "uplink" refers to transmissions to a satellite and, more generally, to any signals transmitted to a communication node of some kind. Similarly the term "downlink" refers to transmissions from a satellite and, more generally, to any signals received from a communication node.

In conventional satellite digital communication systems, multiple uplink communication signals are transmitted to a satellite on multiple radio-frequency (RF) carriers in a frequency division multiplexed (FDM) mode. At the satellite, the multiple uplink carriers are separated, and data signals are recovered from the respective carriers for further processing. Ultimately, the data signals are used to modulate multiple carriers and are retransmitted on multiple downlink channels, which also use FDM. As noted above, using FDM for the downlink channels requires that transmitter amplifiers operate at less than peak power to minimize self interference due to intermodulation effects.

In accordance with the present invention, each downlink beam includes only one carrier, which is time division multiplexed (TDM) among multiple data signals derived from any desired combination of uplink channels. In brief, and as explained in detail below, each downlink signal is constructed from its composite uplink signals by taking time segments of each digitized uplink signal, and speeding up their rate in time as they are converted back to analog signals for the downlink transmission in TDM mode. An important key feature of the invention is that each TDM downlink beam may operate at a significantly higher data rate than any of the FDM uplink signals. To provide a continuous data flow for each communication channel, the uplink and downlink data rates attributable to any channel will be the same. As will be explained with reference to specific examples, in one embodiment of the invention, each uplink channel occupies an equal proportion of a common TDM downlink beam. This does not, however, preclude other configurations of the TDM downlink in which, for example, data derived from a particular uplink channel occupies a larger proportion of the downlink time space than the other channels. In other words, a selected channel can be "slowed down" in the downlink, to provide additional margin (i.e., lower error rate) at the expense of greater usage of the downlink capacity.

As shown in FIG. 1, each ground station processes one or more uplink signals and includes an FDM transmitter 10 and an antenna 12. Typically, each FDM uplink signal will originate from a separate ground station. FIG. 1 depicts the more general case in which each ground station may serve as the origin of multiple FDM uplink signals. In the transmitter 10, multiple data streams, indicated by lines 14, are used to modulate multiple carriers having different frequencies. The resultant modulated carriers are applied to energize the antenna 12. An antenna 20 on an orbiting satellite receives the FDM signals and an FDM receiver 22 translates the separate modulated carriers to a common intermediate frequency and then converts them to digital form at a selected sampling rate, but without demodulating the data. As indicated generally in block 24, these digital signals are buffered, routed, and converted to TDM mode by converting them back to analog form at a selected and, usually, faster rate, in a desired sequence. As will become apparent from a specific example, a single downlink channel may be used to carry data signals derived from one or more selected uplink channels in successive time slots of the TDM downlink channel.

For downlink transmission, the TDM signals are processed by a TDM transmitter 26 and transmitted from an antenna 20'. At each ground station, the TDM signals are received by an antenna 12' and processed in a TDM receiver 28, to recover a stream of data, as indicated by line 30. It will be understood, of course, that the transmitting and receiving antennas 12 and 12' at each ground station may be implemented as a single physical antenna at one ground site or multiple antennas at multiple ground sites. Similarly, the receiving and transmitting antennas 20 and 20' on the satellite may also be implemented as a single or multiple physical antennas.

Figure 2:
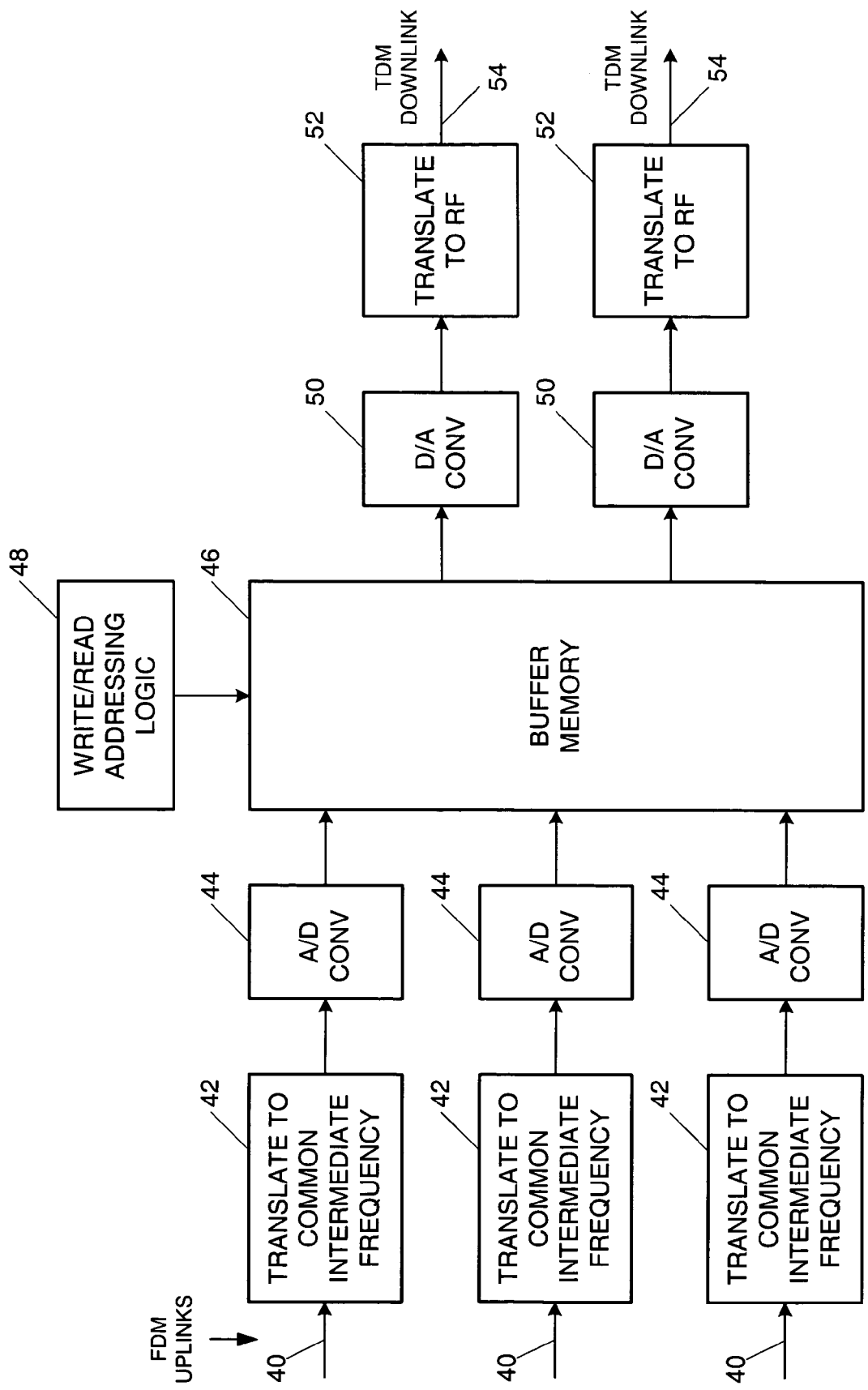
FIG. 2 is a more detailed diagram depicting conversion of data from frequency division multiplexing (FDM) to time division multiplexing (TDM).

FIG. 2 shows the principal components of the FDM receiver 22, the conversion 24 of the signals to TDM, and the TDM transmitter 26. By way of example, FIG. 2 shows three FDM uplink channels 40. As part of the FDM receiver processing, the uplink channels are each translated to a common intermediate frequency (IF), as indicated by the three blocks 42. Then the IF signals are separately sampled in analog-to-digital converters 44 at a selected sampling rate, and the resulting streams of digital signals are stored in a buffer memory 46. For convenience, each digital data stream from an FDM channel is organized into blocks of data sampled over a fixed time interval, such as 10 ms (milliseconds).

In accordance with an important feature of the invention, the data blocks stored in the buffer memory 46 are read out from the memory in a desired sequence that may require selecting data blocks that were associated with different FDM input data streams. Control of the selection of memory addresses for writing to and reading from the buffer memory 46 is effected by write/read addressing logic 48, which may be configured to select different combinations of input data for inclusion in each output TDM downlink beam. As illustrated by way of example, blocks of data read from the buffer memory 46 are processed in multiple TDM downlink beams. Two such beams are shown in FIG. 2, but it should not be assumed that there is any necessary correspondence between the numbers of uplink channels and downlink beams. On the contrary, the signals from any combination of uplink channels can be connected to any combination of downlink beams.

The data blocks selected for each downlink channels are converted back to analog form in digital-to-analog converters 50, and then translated to a desired carrier frequency in translators or upconverters 52, for transmission as multiple downlink beams 54.

Figure 3:
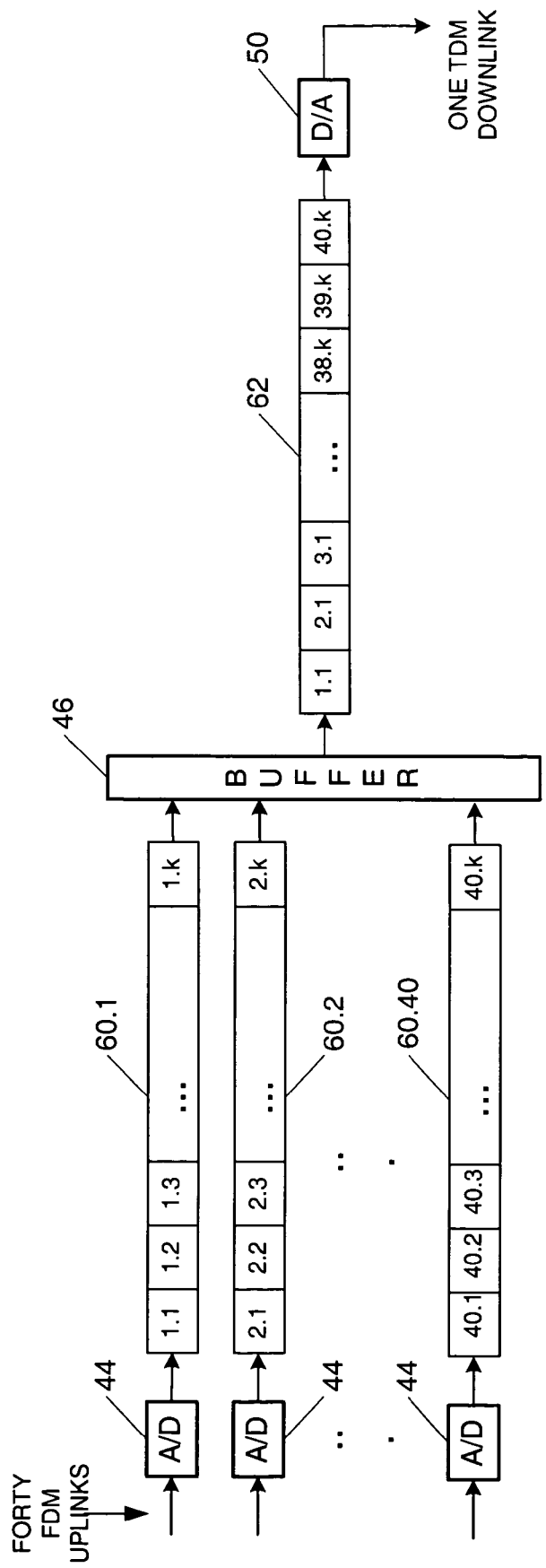
FIG. 3 is a block diagram depicting data flow in a specific embodiment of the invention having forty FDM uplink channels and a single TDM downlink beam.

By way of more specific example, FIG. 3 shows the FDM-to-TDM conversion for a single uplink beam having forty uplink channels on an equal number of frequency multiplexed carriers, as indicated by the data streams 60.1 through 60.40. For purposes of explanation only, blocks of data in data stream 60.1 are numbered 1.1, 1.2, 1.3 and so forth through 1.k, where k is the number of samples per block. Similarly, blocks of data in data stream 60.2 are numbered 2.1, 2.2, 2.3 and so forth through 2.k. Blocks of data in the fortieth data stream 60.40 are numbered 40.1, 40.2, 40.3 and so forth through 40.k. For purposes of illustration, it is assumed that each of the forty data streams has a bandwidth of 1 MHz (megahertz) and that analog-to-digital conversion in A/D converters 44 operates at a rate of 2.5 Msps (megasamples per second). In this example, each sample comprises eight bits of data. Thus, each block of 10 ms length results in 25,000 8-bit samples. The blocks are stored in the buffer memory 46 and are then read from the buffer memory 46 at a rate that is forty times the input rate of a single uplink channel. In this example, the blocks are read in a sequence that selects one block from each of the input channels in turn. Thus, as shown by the TDM data stream indicated at 62, the sequence of data blocks in this stream includes the first block from each successive uplink; i.e., blocks 1.1, 2.1, 3.1 . . . 40.1, then the second block from each successive uplink; i.e., 1.2, 2.2, 3.2 . . . 40.2, and so forth. The downlink sequence ends with blocks 1.k, 2.k, 3.k . . . 40.k.

This TDM stream of data blocks is converted back to analog form at a rated of 100 Msps, in digital-to-analog converter 50, for transmission over a single downlink beam. Because of the higher downlink sampling rate, each data block of 10 ms duration in an uplink channel is compressed, by a factor of forty, to a data block of 250 µs (microseconds) duration, and the downlink signal has a bandwidth of 40 MHz.

In this example, forty simultaneous or parallel FDM uplink signals of 1 MHz bandwidth are converted to forty sequential TDM downlink signals in a single downlink beam of 40 MHz bandwidth. It will be appreciated, however, that the uplink channels do not have to be identical. For example, a lower bandwidth uplink signal is converted to a shorter time duration downlink signal. Further, there may be multiple TDM downlink beams, each configured to carry data derived from any selected combination of FDM uplink channels.

The principal advantage of the technique described is a saving in downlink power. As discussed above, in a conventional bent-pipe transponder using FDM for uplinks and downlinks, the downlink amplifier must be backed off to minimize intermodulation products affecting multiple FDM channels. A typical backoff factor is 4 dB, which corresponds to a power ratio of 0.4. For example, if the downlink peak amplifier power were 100 W (watts), the backed off power would be 40 W, and if the downlink were shared among forty FDM signals, the backed-off power in each FDM signal would be 1 W.

In the embodiment of the invention described above, with forty FDM uplink beams being compressed into a single TDM downlink beam, the downlink transmitter amplifiers may be operated at peak power (100 W) if the signals are of the type known as constant envelope or constant modulus signals; i.e., those using common modulation techniques such as binary phase-shift keying (BPSK), quadrature phase-shift keying (QPSK), or octal phase-shift keying (8PSK). The net improvement obtained by using this technique instead of the conventional FDM downlink approach may be expressed as the ratio of the powers divided by the ratio of signal bandwidths. In this example, the power ratio is 100 times, and the bandwidth ratio is 40 times, resulting in an improvement ratio of 2.5, or 4 dB. In other words, using the technique of the invention, the same downlink performance can be achieved with 4 dB less power than the conventional FDM downlink approach. In a system using multiple downlink beams, this power reduction is particularly significant.

An additional advantage of the TDM downlink approach is that the multiple signals do not have to be resynthesized into an FDM spectrum for downlink transmission. Therefore, there is a significant reduction in hardware needed for the satellite transponder.

Figure 4:
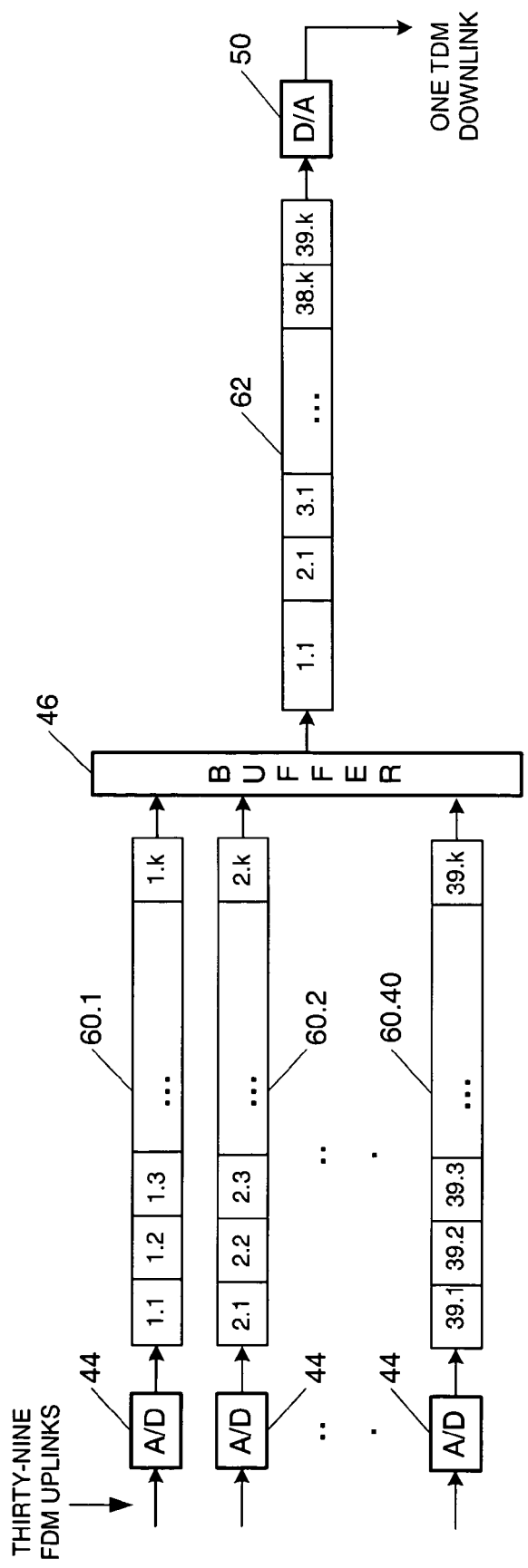
FIG. 4 is a block diagram similar to FIG. 3, in which multiple uplink channels do not share TDM downlink time space on an equal basis.

FIG. 4 is another embodiment of the invention, in which multiple uplink channels do not share the downlink TDM time space on an equal basis. FIG. 4 shows the FDM-to-TDM conversion for a single uplink beam having nine uplink channels on an equal number of frequency multiplexed carriers, as indicated by the data streams 60.1 through 60.9. For purposes of explanation only, blocks of data in data stream 60.1 are numbered 1.1, 1.2, 1.3 and so forth through 1.k, where k is the number of samples per block. Similarly, blocks of data in data stream 60.2 are numbered 2.1, 2.2, 2.3 and so forth through 2.k. Blocks of data in the ninth data stream 60.9 are numbered 9.1, 9.2, 9.3 and so forth through 9.k. For purposes of illustration, it is assumed that, as in the FIG. 3 embodiment, each of the nine data streams has a bandwidth of 1 MHz (megahertz) and that analog-to-digital conversion in A/D converters 44 proceeds at a rate of 2.5 Msps (megasamples per second). In this example, each sample comprises eight bits of data. Thus, each block of 10 ms length results in 25,000 8-bit samples. The blocks are stored in the buffer memory 46 and are then read from the buffer memory 46 at a rate that is a multiple of the input rate of a single uplink channel. In this example, the blocks are read in a sequence that selects one block from each of the input channels in turn. However, blocks derived from the first channel are read at half the rate of the other eight channels. Thus, as shown by the TDM data stream indicated at 62', the sequence of data blocks in this stream includes the first block from each successive uplink; i.e., blocks 1.1, 2.1, 3.1 . . . 9.1, then the second block from each successive uplink; i.e., 1.2, 2.2, 3.2 . . . 9.2, and so forth. The downlink sequence ends with blocks 1.k, 2.k, 3.k . . . 9.k. Note, however, that data derived from the first channel results in a block 1.1 that occupies twice the time duration of the blocks from the other channels, 2.1, 3.1 and so forth. Thus, the first channel occupies a fraction 2/10 of the TDM downlink capacity while each of the other channels occupies a fraction 1/10 of the TDM downlink capacity. The first channel has been "slowed down" in the downlink and will be less susceptible to noise, but at the expense of using a greater proportion of the available downlink capacity.

It will be appreciated that the write/read addressing logic 48 (FIG. 2) can be controlled as desired to perform a routing function. Any selected combination of FDM uplink channels can be routed to any number of selected downlink channels. In the example described above, forty FDM uplink channels were routed into a single TDM downlink beam. The routing function of the buffer memory 46 and its addressing logic 48 provides the flexibility to combine FDM uplink channels into TDM downlink beams in any desired combination. As explained above, in some applications it may be desirable to provide for a selected downlink channel that is deliberately "slowed" to provide additional margin, and a lower error rate, for the downlink transmission of the selected channel.

It will be appreciated from the foregoing that the present invention represents a significant advance in the field of communication systems. In particular, the invention provides a significant saving in downlink power by using a smaller number of TDM downlink beams that can be operated at peak power. It will also be appreciated that, although specific embodiments of the invention have been described for purposes of illustration, various modifications may be made without departing from the spirit and scope of the invention. Accordingly, the invention should not be limited except as by the appended claims.

The invention claimed is:

1. A method for use in a communication system, comprising the steps of:
  receiving multiple uplink beams that comprise multiple frequency division multiplexed (FDM) carriers at a communication node;
  characterized by the steps of:
  separating the multiple FDM carriers by frequency to obtain multiple separated carriers;
  translating each separated carrier of the multiple separated carriers to a common intermediate frequency and converting each separated carrier of the multiple separated carriers to a digital signal without demodulating the multiple FDM carriers;
  storing each digital signal into a buffer memory arranged in data blocks without demodulating the multiple FDM carriers;
  retrieving one or more of the data blocks in a selected sequence to obtain a sequence of data blocks as a time division multiplexed (TDM) digital signal;
  converting the TDM digital signal into a TDM analog signal; and
  transmitting the TDM analog signal as a downlink beam.

2. A method as defined in claim 1, wherein the transmitting step comprises operating downlink transmitter amplifiers at or near peak power.

3. A method as defined in claim 1, wherein the storing step comprises:
  storing the data blocks for each digital signal in parallel in the buffer memory, wherein each data block corresponds to a selected time duration.

4. A method as defined in claim 1, wherein the retrieving step also performs a routing function by merging selected data blocks of the multiple separated carriers into one or more TDM downlink beams that comprise the downlink beam.

5. A method as defined in claim 3, wherein:
  a number of FDM carriers is n;
  wherein the step of translating comprises the step of:
  converting each separated carrier of the multiple separated carriers to the digital signal at a first sampling rate S1;
  wherein the step of converting comprises the step of:
  converting the TDM digital signal into the TDM analog signal at a second sampling rate S2;
  wherein the second sampling rare S2 is n times the first sampling rate S1; and
  the bandwidth of the downlink beam is n times the bandwidth of one of the multiple FDM carriers.

6. A method as defined in claim 3, wherein:
  the step of transmitting the TDM analog signal comprises translating the TDM analog signal to a selected carrier frequency.

7. A method as defined in claim 3, wherein:
  a number of FDM carriers is n;
  wherein the step of translating comprises the step of:
  converting each separated carrier of the multiple separated carriers to the digital signal at a first sampling rate S1;
  wherein the step of converting comprises the step of:
  converting the TDM digital signal into the TDM analog signal at a second sampling rate S2;
  wherein the second sampling rate S2 is greater than n times the sampling rate S1;
  wherein the step of retrieving comprises:
  retrieving one or more of the data blocks at a slower rate for reduced transmission noise.

8. A method as defined in claim 7, wherein:
  there is only one selected FDM carrier;
  data blocks pertaining to the selected FDM carrier are retrieved from the buffer memory at half the speed at which data blocks pertaining to the other uplink channels are retrieved;
  the sampling rate S2 is (n+1) times the sampling rate S1;
  data blocks derived from the selected FDM carrier occupy, in the downlink beam, twice the proportion of time and correspondingly one-half the bandwidth of data blocks derived from any of the other FDM carriers; and
  the downlink beam has a bandwidth of (n+1)×2 times the bandwidth of data derived from the selected FDM carrier, and (n+1) times the bandwidth of data derived from each of the other FDM carriers.

9. A communication system transponder with reduced downlink power requirements, comprising:
  a receiver configured to receive frequency division multiplexed (FDM) signals as multiple uplink channels carried on multiple uplink beams, wherein the receiver is configured to separate the FDM signals by carrier frequency into multiple separated carriers;
  characterized by:
  means for translating each separated carrier of the multiple separated carriers to a common intermediate frequency and converting each separated carrier of the multiple separated carriers to a digital signal without demodulating the multiple FDM carriers;
  means for storing each digital signal into a buffer memory arranged in data blocks without demodulating the multiple FDM carriers;
  means for retrieving one or more of the data blocks in a selected sequence to obtain a sequence of data blocks as a time division multiplexed (TDM) digital signal;
  means for convening the TDM digital signal into a TDM analog signal;
  a transmitter for transmitting the TDM analog signal as a downlink beam;
  wherein transmitting TDM signals allows transmitter amplifiers to be operated at or near peak power.

10. A communication system transponder as defined in claim 9, wherein the means for translating comprises:
  analog-to-digital conversion means, operating on each separated carrier of the multiple separated carriers at a first sampling rate S1;
  wherein the means for storing comprises a buffer memory for storage of the data blocks corresponding to a selected time duration;

wherein the transmitter is configured to transmit a plurality of downlink beams, wherein the plurality of downlink beams comprise the downlink beam;

wherein the means for retrieving comprises means for retrieving the one or more of the data blocks from the buffer memory in as many sequences as there are downlink beams; and wherein the means for converting the TDM digital signal into the TDM analog signal comprises digital-to-analog conversion means, operating on the retrieved sequences of blocks of data at a second sampling rate S2.

11. A communication system transponder as defined in claim 10, where S2 is greater than S1.

12. A communication system transponder as defined in claim 10, wherein:

a number of uplink channels is n;

a number of downlink beams is one;

the second sampling rate S2 is n times the first sampling rate S1; and the bandwidth of the downlink beam is n times the bandwidth of any of the uplink channels.

13. A communication system transponder as defined in claim 10, wherein:

the transmitter comprises means for translating the TDM analog signal to a selected carrier frequency for transmission.

14. A communication system transponder as defined in claim 10, wherein:

a number of uplink channels is n;

a number of downlink beams is one;

the second sampling rate S2 is greater than n times the sampling rate S1;

in the means for retrieving, the data block pertaining to at least one selected uplink channel are retrieved at a slower rate than data blocks pertaining to the other uplink channels; and output data blocks from the digital-to-analog conversion means, pertaining to the at least one selected channel occupy a larger proportion of time and a correspondingly smaller bandwidth in the sequence of TDM signals, whereby the data blocks pertaining to the at least one selected channel are subject to a lower susceptibility to noise in the downlink beam.

15. A communication system transponder as defined in claim 14, wherein:

there is only one selected uplink channel;

data blocks pertaining to the selected uplink channel are retrieved from the buffer memory at half the speed at which data blocks pertaining to the other uplink channels are retrieved;

the sampling rate S2 is (n+1) times the sampling rate S1;

data blocks derived from the selected uplink channel occupy one-half the bandwidth of any of data blocks derived from any of the other uplink channels; and the downlink beam has a bandwidth of (n+1)×2 times the bandwidth of data blocks derived from the selected uplink channel, and (n+1) times the bandwidth of data blocks derived from any of the other uplink channels.

16. A communication system transponder as defined in claim 10, and further comprising:

means for controlling the buffer memory and the means for retrieving data blocks from the buffer memory, to perform a muting function wherein data blocks received from selected FDM uplink channels are routed to selected TDM downlink beams.

* * * * *